F. H. STEBBINS AND W. A. HOPKINS.
CLUTCH FOR STEERING CONTROL SYSTEMS.
APPLICATION FILED AUG. 13, 1917.
1,312,708.
Patented Aug. 12, 1919.
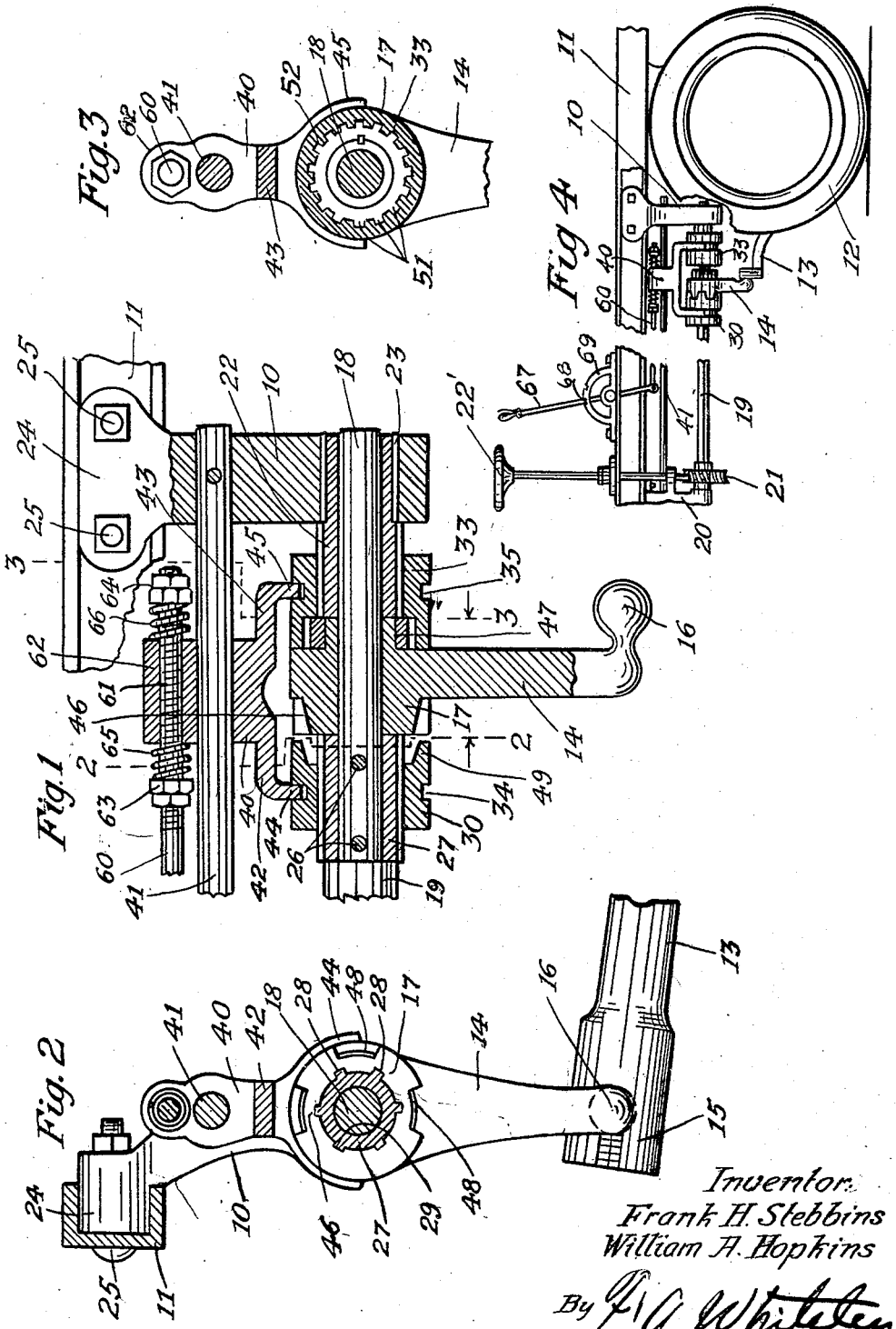

UNITED STATES PATENT OFFICE.

FRANK H. STEBBINS AND WILLIAM A. HOPKINS, OF MINNEAPOLIS, MINNESOTA, ASSIGNORS TO ANTON HUHN, OF MINNEAPOLIS, MINNESOTA.

CLUTCH FOR STEERING-CONTROL SYSTEMS.

1,312,708.   Specification of Letters Patent.   Patented Aug. 12, 1919.

Application filed August 13, 1917.   Serial No. 185,842.

*To all whom it may concern:*

Be it known that we, FRANK H. STEBBINS and WILLIAM A. HOPKINS, citizens of the United States, residing at Minneapolis, in the county of Hennepin and State of Minnesota, have invented certain new and useful Improvements in Clutches for Steering-Control Systems, of which the following is a specification.

Our invention relates to clutches for steering control system and has for its object to provide, in combination with a control lever, a clutch mechanism adapted to hold said lever either locked integrally to the frame members or locked to a shaft or other device for actuating the lever.

The full objects and advantages of our invention will appear in connection with the detailed description thereof and are particularly pointed out in the claims.

In the drawings illustrating the application of our invention in one form,—

Figure 1 is a sectional elevation view showing our clutch mechanism with the operating member locked thereby to the frame. Fig. 2 is a sectional view on line 2—2 of Fig. 1. Fig. 3 is a sectional view on line 3—3 of Fig. 1. Fig. 4 is a fragmentary side elevation view showing the manner of applying the device to the steering control system of a truck.

As illustrated, a frame member 10 is held rigidly positioned to a main frame 11 as of an automobile truck, having steering wheels 12 controlled by an arm 13 connected with the steering knuckles and a lever 14 for operating the arm 13. As shown, the arm 13 comprises a socket head 15 for adjustably receiving a ball 16 on the end of the control lever 14. This lever is provided with a hub 17 by means of which the same is freely journaled upon a reduced portion 18 of a shaft 19 which is carried by frame member 10 and another frame member 20 and which has thereon a worm gear 21 operated by hand wheel 22' by means of which the shaft 19 is rotated. The portion 18 of the shaft 19 upon which hub 17 is journaled extends through a sleeve 22, which sleeve is formed with teeth or ribs 23 which engage within corresponding grooves in an aperture in frame member 10, thus holding the sleeve 22 locked against rotation within frame member 10. The frame member 10 can be connected with main frame 11 in any desired way so as to hold same rigid with said frame member. When the frame member is channeled, as shown, the member 10 may have a head 24 which seats within the channel 11 and by means of bolts 25 the head 24 is rigidly locked against turning movement to the channel frame member 11. Secured to the shaft portion 18 on the opposite side of hub 17 from sleeve 22, by means of pins 26, is a member 27 which, as shown in Fig. 2, is provided with a multiplicity of ribs 28 which engage within corresponding grooves 29 in a clutch member 30. The sleeve 22 also is provided with a multiplicity of ribs 51 which engage within corresponding grooves 52 of a clutch head 33 which is slidable on the sleeve 22. The clutch member 30 has thereon a shifter groove 34 and the clutch member 33 has a corresponding shifter groove 35. A shifter member 40 is slidably mounted on a rod 41 and has a pair of arms 42 and 43 respectively which have shifter forks 44 and 45 that engage in respective grooves 34 and 35, thus holding the clutch heads 30 and 33 in fixed spaced relation. The hub 17 has a clutch face 46 facing the clutch head 30 and a clutch face 47 facing the clutch head 33, as best shown in reference to clutch head 46. There are provided a multiplicity of sockets 48 unequally spaced and adapted to receive a corresponding number of clutch teeth 49 on clutch head 30, the arrangement being such that clutching engagement between members 30 and 46 can only take place when the shaft 19 has turned the member 30 into a certain definite position. The same construction for the same purpose is provided in reference to clutch members 33 and 47. The shifter member 40 is held and operated upon the rod 41 by means of a rod 60 which passes through an opening 61 in a projection 62 of the member 40. The rod 60 is provided with sets of nuts 63 and 64 between which and the adjacent sides of the member 40 of the extension 62 are springs 65 and 66, the force of which is regulated by the nuts 63 and 64.

As shown in Fig. 4, the rod 60 is connected to the lower end of a hand lever 67 having the customary means for locking it with either one of the notches 68 in a segment 69 secured to the frame.

It will thus be seen that a double clutch construction is provided whereby the hub 17 and attached operating arm 14 is always constrained to be clutched to member 33 or to member 30, in the former case being held rigidly connected with the frame and in the latter case being placed in driving connection with the shaft 19.

The advantages of our invention will be apparent. It provides a simple and efficient clutch mechanism for rendering an operative part at will either locked to a fixed member or locked to an actuating member without possibility of any neutral or intervening position. This insures a definite relation of the operating part to the fixed member at any time that the same may be released from the fixed member and placed in coöperation with the actuating member. The arrangement is of particular utility for rendering the steering wheels of an automobile either fixed relative to the frame or connected to the steering apparatus, in which it is essential that when fixed relative to the frame the wheels shall be in planes parallel to the frame and line of direction of the vehicle.

Our construction also permits the operating member 14 together with any parts connected thereto, to be locked to the fixed member in various different relations with respect to the fixed member because of the multiplicity of teeth 51 formed on the clutch head 47 and coöperating with corresponding teeth or grooves 52 integrally formed in the slidable clutch 33. Because of the number of uniformly spaced teeth, it will be apparent that various locking adjustments may be effected for the operating member 14.

We claim:

1. A clutch device comprising an operating member, an actuating member normally free from said operating member, a fixed member, a clutch device on the fixed member, a clutch device on the actuating member, and means to cause either of said devices to lock the operating member respectively to the fixed member or to the actuating member.

2. A clutch device comprising a shaft, an operating member having a hub freely journaled on said shaft, a fixed member adjacent said shaft, clutch devices formed on opposite sides of the hub, clutch members splined to the shaft and the fixed member respectively, and means for simultaneously moving said clutch members one into and the other out of clutching engagement with the hub.

3. A clutch device comprising a shaft, an operating member having a portion thereof journaled loosely on said shaft, said portion being formed with clutch faces on opposite sides thereof, a fixed member forming a bearing for said shaft, slidable clutch members splined respectively to the fixed member and to the shaft, a double fork holding said clutch members spaced so that one or the other must always be in clutching engagement with one of said clutch faces, and means to actuate the fork.

4. A clutch device comprising a shaft, an operating member having a portion thereof journaled loosely on said shaft, said portion being formed with clutch faces on opposite sides thereof, a fixed member forming a bearing for said shaft, slidable clutch members splined respectively to the fixed member and to the shaft, a double fork holding said clutch members spaced so that one or the other must always be in clutching engagement with one of said clutch faces, and a rod having yielding connection in both directions with said fork for actuating the fork.

5. A clutch device comprising a shaft, an operating member having a hub freely journaled on said shaft, a fixed member adjacent said shaft, clutch devices formed on opposite sides of the hub, slidable clutch members splined to the shaft and fixed member, respectively, the clutch members on the hub and fixed member being so formed as to coöperate in various positions for locking the operating member in different positions of adjustment relative to the fixed member, and means for simultaneously moving said clutch members one into and the other out of clutch relation with the hub.

In testimony whereof we affix our signatures.

FRANK H. STEBBINS.
WILLIAM A. HOPKINS.